(No Model.) 2 Sheets—Sheet 1.
H. B. DOOLITTLE.
GATE.
No. 434,326. Patented Aug. 12, 1890.
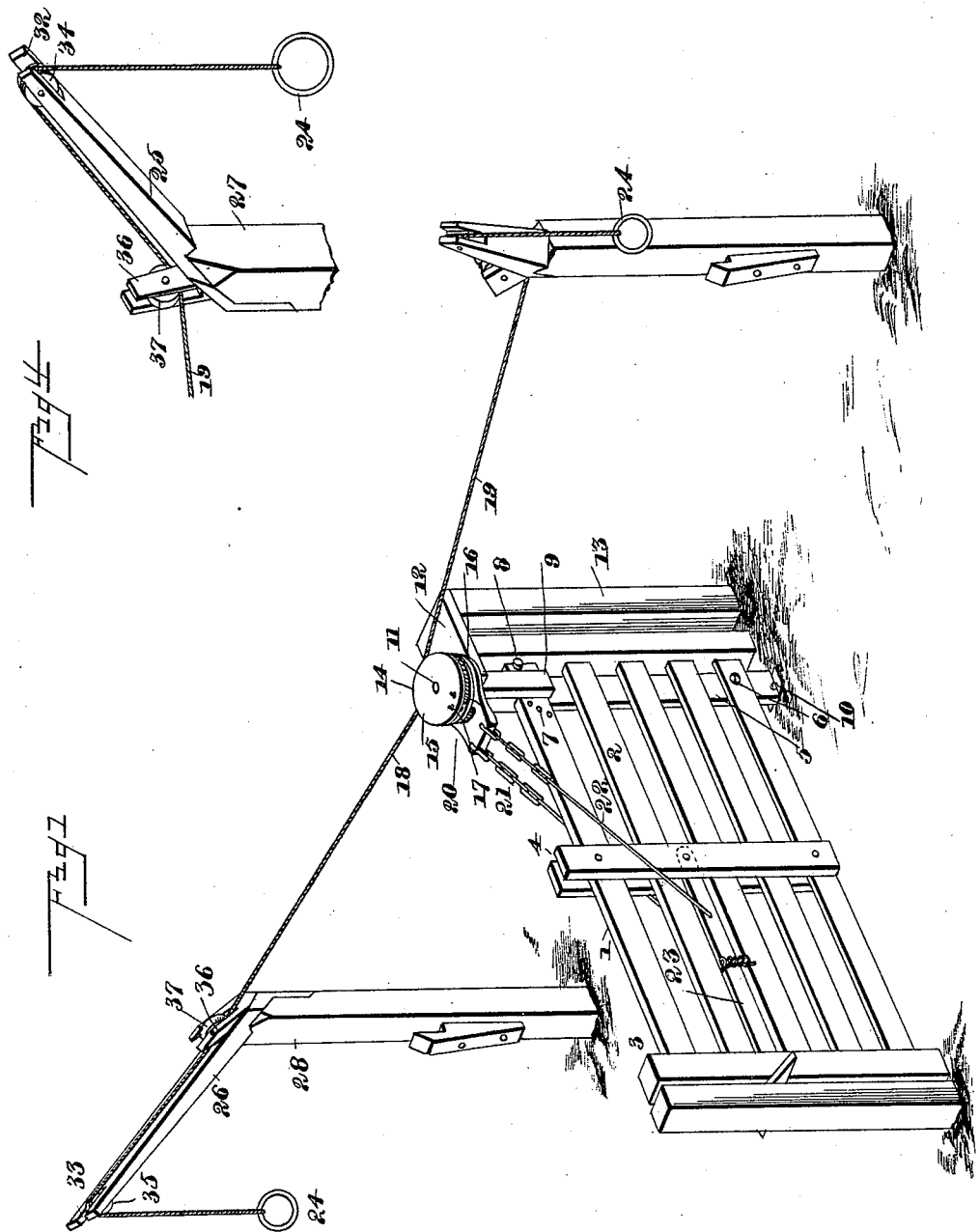
Witnesses
Inventor
Henery B. Doolittle
By his Attorneys
C. A. Snow & Co.

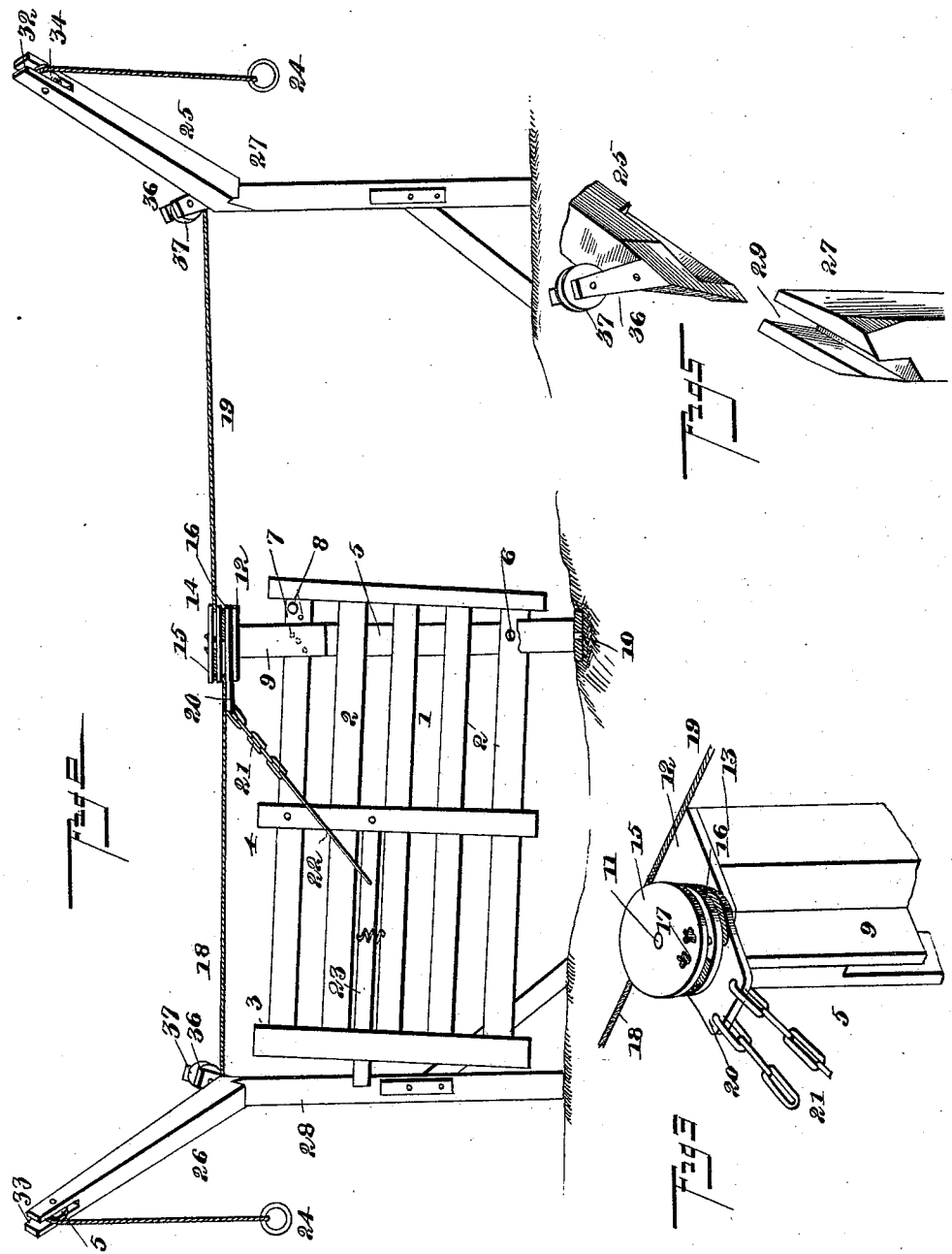

UNITED STATES PATENT OFFICE.

HENRY BLACK DOOLITTLE, OF DOOLITTLE'S MILLS, INDIANA.

GATE.

SPECIFICATION forming part of Letters Patent No. 434,326, dated August 12, 1890.

Application filed March 8, 1890. Serial No. 343,155. (No model.)

*To all whom it may concern:*

Be it known that I, HENRY BLACK DOOLITTLE, a citizen of the United States, residing at Doolittle's Mills, in the county of Perry and State of Indiana, have invented a new and useful Gate, of which the following is a specification.

The invention relates to improvements in swinging gates.

The object of the present invention is to provide a simple and inexpensive gate adapted to be unlatched, opened, maintained in its open position, and closed without the necessity of dismounting from a horse or leaving a vehicle.

A further object of the invention is to enable the gate to be readily adjusted to prevent sagging.

The invention consists in the construction and novel combination and arrangement of parts, hereinafter fully described, illustrated in the accompanying drawings, and pointed out in the claims hereto appended.

In the drawings, Figure 1 is a perspective view of a gate constructed in accordance with the invention. Fig. 2 is a side elevation, the gate being shown in its open position. Fig. 3 is a detail view of the upper portion of the gate. Fig. 4 is a detail view of one of the posts for supporting the operating-cord. Fig. 5 is a detail perspective view of the dovetailed ends of the post and its arm.

Referring to the accompanying drawings, 1 designates the gate, of any desirable construction, and is preferably composed of parallel rails 2 and vertical bars 3 and 4, the former being arranged at the end of the gate and the latter being, preferably, two in number and arranged at the center of the gate at each side thereof. The gate is pivoted at its lower rear end to a vertical bar 5 and is adapted to be elevated on its pivoting-screw 6 to prevent sagging and to maintain the gate at any desirable elevation. The upper rail is provided with series of perforations 7, that are adapted to receive a pin 8. The pin 8 engages a strip 9, secured to the side of the vertical bar 5, and the latter is recessed, and the lower end of the strip 9 projects below the upper shoulder of the recess, and the upper rail of the gate is arranged in the space between the depending portion of the strip and the bar and is prevented falling away from the bar.

The vertical bar 5 has its lower end provided with a pivot 10, that is arranged in a suitable bearing, and the upper end of the bar is provided with a vertical rod 11, that is journaled in suitable bearings of a horizontal arm 12, that is secured to the top of a hinge-post 13. Mounted loosely upon the vertical rod 11 is a pulley 14, which is provided with disks 15 and 16, that are arranged at the side and project beyond the central portion and form flanges. The upper disk is provided with perforations 17, in which are secured the ends of operating-cords 18 and 19, that extend around the pulley in opposite directions in separate grooves, and when pulled upon are adapted to rotate the pulley in opposite directions. The disk 16 is provided with an extension 20, that projects in the direction of the gate and has secured to it by links 21 rods 22, which are attached to a pivoted drop-latch 23, and when one of the operative cords is pulled upon the disk is partially rotated independently of the gate and draws upon the rods 22 and lifts the latch 23 out of engagement with a notch of a latch-hook, after which the gate is swung open by further pulling upon the operating-cord. The gate opens upon either side and always from the person opening the gate. The ends of the operating ropes or cords are provided with rings 24 or other suitable handles, and they are supported over the center of the road by inclined arms 25 and 26, that are secured to the upper ends of posts 27 and 28. The upper ends of the posts are beveled and are provided with inclined dovetailed slots 29, in which are arranged the lower ends of the inclined arms 25 and 26. These ends 30 and 31 are rabbeted and conform to the configuration of the slots or grooves 29, and they have their outer faces beveled and arranged flush with the faces of the post. The ends 32 and 33 of the inclined arm are bifurcated and provided with pulleys 34 and 35, over which pass the ends of the ropes 18 and 19. The inclined arms are arranged at an angle of about forty-five degrees and extend from the gate to be clear of the latter, and they have secured to their lower ends brackets 36, that project upward at a slight inclination, and have their upper ends bifurcated and provided with rollers or pulleys 37, under which the ropes pass, and which guide the ropes that pass up the inclined arms. The posts 27 and 28 are suitably braced and provided with recesses to receive the latch and maintain the gate in its open position.

It will readily be seen that the gate is simple and inexpensive in construction, adapted to be readily adjusted to prevent sagging, and has the ends of its operating cords or ropes arranged over the middle of the road, and it always opens away from the operator and is maintained in its open and closed positions until changed by the operator.

Having thus described my invention, what I claim is—

1. In a gate, the combination of the pivoted bar provided at its upper end with a rod, the gate secured to the bar and having a pivoted latch, the pulley loosely mounted on the vertical rod and provided with the disk 16, having an extension, and also with a disk 15, the ropes oppositely arranged upon the pulleys and secured to the disk 15, the posts 27 and 28, provided with inclined arms dovetailed in their upper end and bifurcated and provided with pulleys, and the brackets extending outward from the post at the point of attachment of the arms and having guide-pulleys, substantially as described.

2. In a swinging gate, the combination of the vertical pivoted bar provided at its upper end with a rod, the gate having its bottom pivoted to the bar and its top provided with a series of perforations adapted to receive a pin to adjust the gate, the pivoted latch, the pulley loosely mounted on the vertical rod and provided with the disk 16, having an extension, and also with a disk 15, the rods connected to the latch and having the links 21, connected to the said extension, the ropes oppositely arranged upon the pulley and secured to the disk 15, the posts 27 and 28, having inclined arms dovetailed in their upper ends and bifurcated and provided with pulleys, and the brackets extending outward from the posts at the point of attachment of the arms and provided with pulleys, substantially as described.

In testimony that I claim the foregoing as my own I have hereto affixed my signature in presence of two witnesses.

HENRY BLACK DOOLITTLE.

Witnesses:
DAVID PETTIT,
GEORGE L. SEATON.